(12) United States Patent
Lee

(10) Patent No.: US 6,318,776 B1
(45) Date of Patent: Nov. 20, 2001

(54) TONGS FOR HOLDING COOKING CONTAINER

(75) Inventor: Sang Ok Lee, Seoul (KR)

(73) Assignee: Sung Chang Mart Co., Ltd., Gyeonggi-Do (KR)

( * ) Notice: Subject to any disclaimer, the term of this patent is extended or adjusted under 35 U.S.C. 154(b) by 0 days.

(21) Appl. No.: 09/643,986

(22) Filed: Aug. 22, 2000

(51) Int. Cl.$^7$ .................................................. A47J 45/00
(52) U.S. Cl. .............................................. 294/34; 220/759
(58) Field of Search ................................ 294/34, 29, 30, 294/31.1, 9; 220/759

(56) References Cited

U.S. PATENT DOCUMENTS

| | | | |
|---|---|---|---|
| 2,077,273 | * | 4/1937 | Serio ..................................... 294/31.1 |
| 2,228,547 | * | 1/1941 | Whitehead ............................... 294/34 |
| 2,777,725 | * | 1/1957 | Weir ........................................ 294/34 |
| 3,304,112 | * | 2/1967 | Elliott ..................................... 294/34 |
| 3,474,486 | * | 10/1969 | Morris et al. ......................... 294/31.1 |
| 4,241,946 | * | 12/1980 | Spoeth, Jr. ............................ 294/31.1 |
| 4,577,367 | * | 3/1986 | Durand ................................. 220/759 |
| 5,704,092 | * | 1/1998 | Nicollet et al. ....................... 220/759 |
| 6,000,100 | * | 12/1999 | Montgelard ........................... 220/759 |

FOREIGN PATENT DOCUMENTS

1279608 * 12/1986 (SU) ................................... 294/31.1

* cited by examiner

*Primary Examiner*—Eileen D Lillis
*Assistant Examiner*—Paul T. Chin

(74) *Attorney, Agent, or Firm*—Steve Cha; Klauber & Jackson

(57) ABSTRACT

Tongs for holding a cooking container includes: a body being of a shape adequate to be held by a hand and extending by a predetermined length in a longitudinal direction thereof, the body having a fixed holding part being in contact with the high-cut outer peripheral wall of the cooking container at the end portion thereof and a receiving chamber formed in the interior thereof; a movable member having a movable holding part being in contact with the high-cut inner peripheral wall of the cooking container at the end portion thereof in order to hold the cooking container in relation to the fixed holding part of the body, the movable member received within the receiving chamber and having one end connected to a spring mechanism installed in the body, thus to be disposed within the body forwardly and backwardly relative to the fixed holding part; an operating lever supported rotatably on the body at the one end thereof, thus to be inserted and drawn into/from the interior and exterior of the receiving chamber; and a power transmission device having a rotary member and a guide member, the rotary member and the guide member converting a rotating force of the operating lever into a rectilinear motion of the movable member, in co-operation with each other, as the operating lever is inserted into the receiving chamber, for moving the movable member into the interior of the receiving chamber to be engaged with the high cut portion of the cooking container for holding the cooking container in co-operation with the fixed holding part and the movable member; whereby as the operating lever is drawn from the receiving chamber, the co-operating relationship of the rotary member and the guide member is released and by the recovering force of the spring mechanism, the movable member moves forwardly relative to the fixed holding part, thus to release the holding of the cooking container.

12 Claims, 8 Drawing Sheets

TONGS FOR HOLDING COOKING CONTAINER

BACKGROUND OF THE INVENTION

1. Field of the Invention

The present invention relates to tongs for holding and moving a cooking container such as a fry pan, a pot and the like and more particularly, to tongs for holding a cooking container in a safe manner, upon moving the cooking container being in a heating state, without being exposed to danger of burns.

2. Description of the Related Art

Various kinds of tongs or clamping instruments are developed in order to move cooking containers in a heating state or cooking containers where other contents are contained, all of which are difficult in being held in accordance with the cooking states of the cooking containers irrespective of existence/non-existence of their bails. Generally, an instrument for holding the cooking container includes a body being of a bar shape adequate to be held by one hand of a user, a rotary lever adapted to be inserted and drawn in upward and downward directions into/from the interior and exterior of a space portion formed in the body, and a holding member moving forwardly and backwardly on the front portion of the body by using the rotation of the lever, for holding and releasing the cooking container. Additionally, the instrument for holding the cooking container further includes a locking device for rigidly holding the cooking container in the state where the lever is inserted into the space portion.

Under the above construction, the conventionally developed instruments for holding the cooking container have been mainly focused to any one of the following factors: the convenience in use (that is, the manipulation by one hand or both hands), the complexity of the whole configuration, the rigidity of the holding of the cooking container, the accuracy in operation of the locking device and so on. Therefore, various endeavors for holding and moving in a safe manner the cooking container by the easy and stable manipulation of the cooking container holding instrument upon holding and releasing of the cooking container are made and will be unceasingly tried.

SUMMARY OF THE INVENTION

It is, therefore, an object of the present invention to provide tongs for holding a cooking container capable of holding and releasing the cooking container in a complete manner, thereby holding and moving the cooking container in a safe manner.

It is another object of the present invention to provide tongs for holding a cooking container capable of constructing a power transmission device for converting a rotating force of an operating lever into a rectilinear motion of a movable member with on the one hand, a rotary disc and a rail for guiding the movement of the rotary disc and on the other hand, a pair of gears being engaged and rotated, thereby ensuring the reliability of the power transmission and the endurance of the loading caused due to the holding of the cooking container.

To attain these and other objects of the present invention, there is provided tongs for holding a cooking container including: a body being of a shape adequate to be held by one hand and extending by a predetermined length in a longitudinal direction thereof, the body having a fixed holding part being in contact with the high-cut outer peripheral wall of the cooking container at the end portion thereof and a receiving chamber formed in the interior thereof; a movable member having a movable holding part being in contact with the high-cut inner peripheral wall of the cooking container at the end portion thereof in order to hold the cooking container in co-operation with the fixed holding part of the body, the movable member received within the receiving chamber and having one end connected to a spring means installed in the body, thus to be disposed within the body forwardly and backwardly relative to the fixed holding part; an operating lever supported rotatably on the body at the one end thereof, thus to be inserted and drawn into/from the interior and exterior of the receiving chamber; and a power transmission device having a rotary member and a guide member, the rotary member and the guide member converting a rotating force of the operating lever into a rectilinear motion of the movable member, in co-operation with each other, as the operating lever is inserted into the receiving chamber, for moving the movable member into the interior of the receiving chamber to be engaged with the high cut portion of the cooking container, thereby holding the cooking container in co-operation with the fixed holding part and the movable member; whereby as the operating lever is drawn from the receiving chamber, the co-operating relationship of the rotary member and the guide member is released and by the recovering force of the spring means, the movable member moves forwardly relative to the fixed holding part, thus to release the holding state of the cooking container.

BRIEF DESCRIPTION OF THE DRAWINGS

FIGS. 4a and 4b are plan views illustrating the state where the upper member of the tongs for holding the cooking container according to the present invention is removed, wherein FIG. 4a shows the tongs which holds the cooking container and FIG. 4b shows the tongs for releasing the holding state of the cooking container;

FIGS. 6a and 6b are plan views illustrating the state where the upper member of the tongs for holding the cooking container according to the present invention is removed, wherein FIG. 6a shows the state before the tongs holds the cooking container and FIG. 6b shows the state at the time when the tongs holds the cooking container.

DETAILED DESCRIPTION OF THE PREFERRED EMBODIMENT

Figure 1:
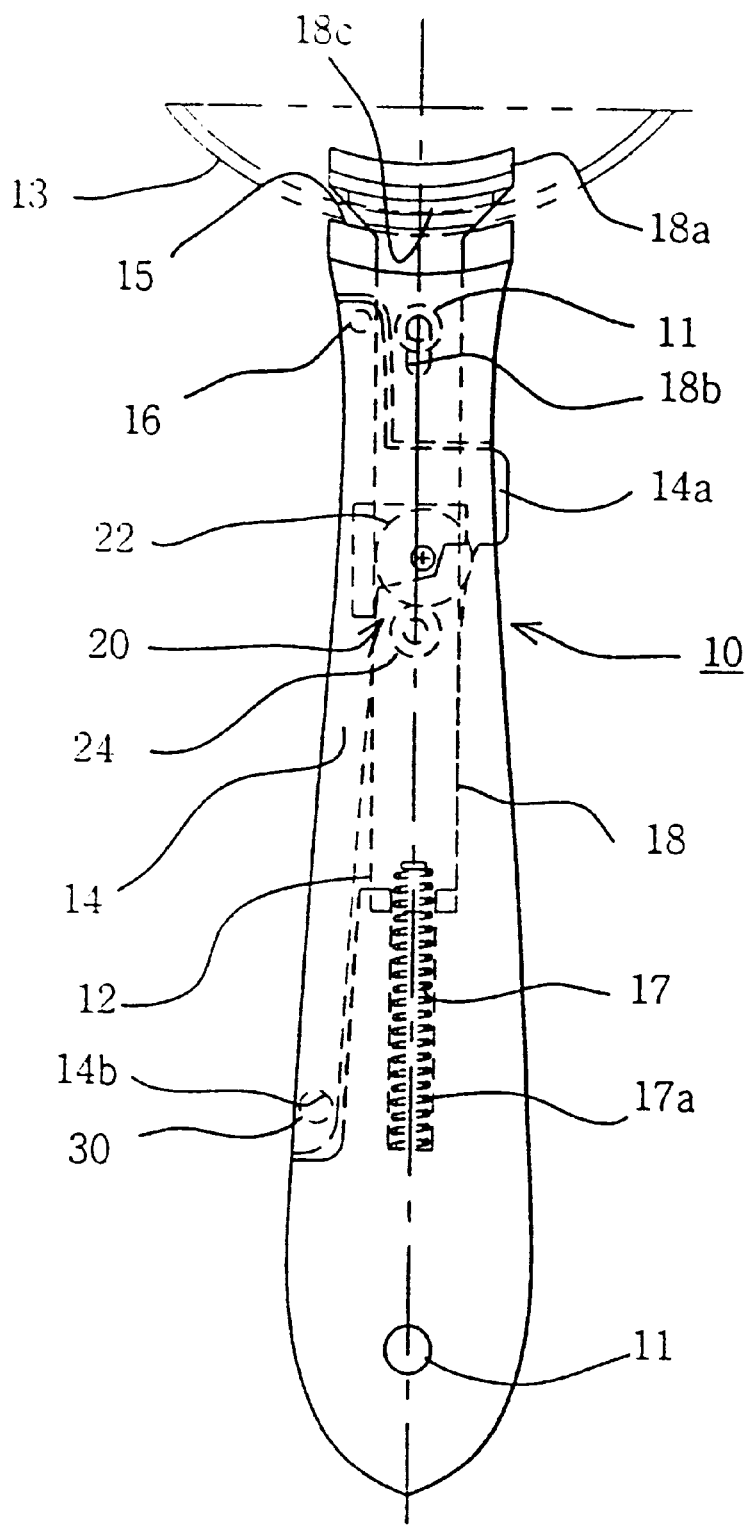
FIG. 1 is a plan view illustrating tongs for holding a cooking container according to a first embodiment of the present invention.

Now, an explanation of the construction and operation of tongs for holding a cooking container according to a first embodiment of the present invention will be hereinafter discussed with reference to FIGS. 1 to 4. Firstly, FIG. 1 is a plan view illustrating tongs for holding a cooking container according to a first embodiment of the present invention, and FIG. 2 is a longitudinal sectional view of FIG. 1.

The tongs according to the present invention includes a body 10 which takes a narrow bar shape adequate to be held by one hand of a user, when taken in plan and front views and extends by a predetermined length in a longitudinal direction thereof. The interior of the body 10 is provided with a receiving chamber 12 having an opening 12a formed along one vertical side of the body 10. An operating lever 14, which is somewhat shorter in length than the body 10, is installed to be inserted and drawn, in a horizontal direction parallel with the body 10, into/from the interior and exterior of the receiving chamber 12, on the center of a hinge shaft 16 installed on the front end side of the body 10. At this time, the operating lever 14 received in the receiving chamber 12 of the body 10 is adapted to be drawn from the receiving chamber 12 by means of a release button 14a which is installed to be exposed on the other side of the body 10, as opposed to the opening 12a formed for the insertion and drawing of the operating lever 14 into/from the receiving chamber 12. By the rotating operation of the operating lever 14 operating in a horizontal direction relative to the body 10 through the opening 12a formed on the one vertical side of the body 10, a movable member 18 installed in a length direction of the body 10 on the upper side of the body 10 moves forwardly and backwardly, thereby holding and releasing the cooking container. The operation of the operating lever 14 in a side direction of the body 10 enables the cooking container to be held and released in a stable manner upon the holding of the cooking container as well as when the operating lever 14 is drawn from the receiving chamber 12 by means of the release button 14a.

Figure 2:
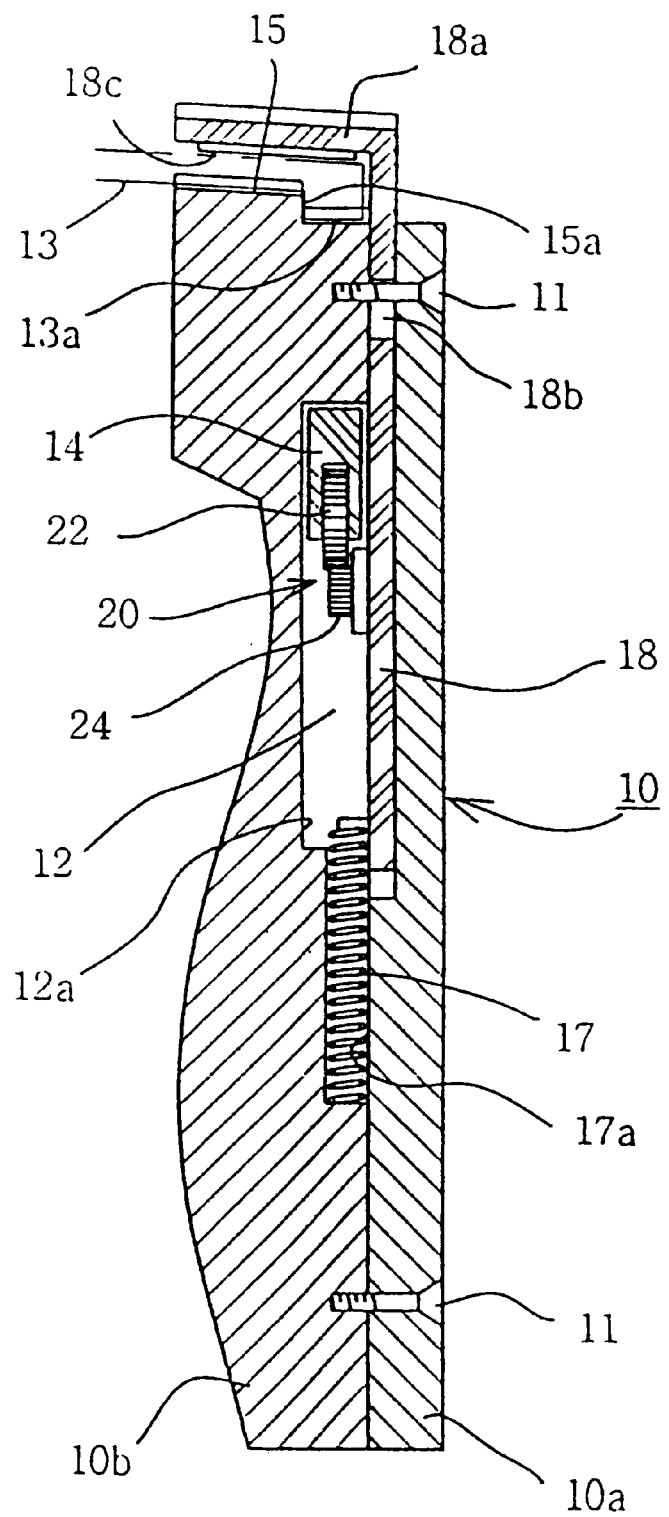
FIG. 2 is a longitudinal sectional view of FIG. 1.

As shown in FIGS. 1 and 2, the body 10 is configured in such a manner that an upper member 10a and a lower member 10b may be separated and assembled from/with each other, while interposing the movable member 18 therebetween. In this case, the upper member 10a functions as a cover for opening and closing the interior of the body 10, in order to assemble or exchange each component as will be hereinafter discussed such as the movable member 18 installed within the body 10. The upper member 10a is coupled with the lower member 10b to thereby guide the forward and backward movement of the movable member 18. The upper member 10a is coupled with the lower member 10b by means of a screw 11.

The lower member 10b of the body 10 has a fixed holding part 15 that is in contact with the outer peripheral wall of a high cut portion 13 of the cooking container at the front end thereof. At this time, the fixed holding part 15 is provided with a stage projection 15a on the upper side thereof, on which a protruded edge 13a protruded outwardly on the upper peripheral surface of the high cut portion 13 of the cooking container is disposed in a projection-locked manner. The stage projection 15a serves to hold the high cut portion 13 of the cooking container in the state where the edge 13a of the cooking container has been disposed on the stage projection 15a in a stable manner, upon holding the cooking container by means of the body 10 of the tongs, thereby preventing the deviation of the cooking container from the tongs.

As noted above, the movable member 18, which is interposed between the upper and lower members 10a and 10b, is freely movable along a length direction of the body 10. The movable member 18 is formed integrally with a movable holding part 18a that is in contact with the inner peripheral wall of the high cut portion 13 of the cooking container at the front end thereof. The movable holding part 18a acts with the fixed holding part 15 of the lower member 10b to directly serve to hold or release the high cut portion 13 of the cooking container.

The one end of the movable member 18 is supported by means of a spring means 17 which is accommodated in a recess 17a formed in the body 10 and at the moment when the operating lever 14 is drawn from the receiving chamber 12, the movable member 18 moves forwardly relative to the body 10 by the restoring force of the spring means 17. The movable member 18 is provided with a slot 18b in which a supporting body that is protruded in a perpendicular direction to the slot 18b is formed. As a result, the movable member 18 moves forwardly and backwardly relative to the body 10 by the stroke distance of the slot 18b by means of the supporting body. In the first embodiment of the present invention, the screw 11 serves as the supporting body, but the supporting body may be protruded from the upper member 10a or the lower member 10b of the body 10. Also, the stroke distance of the slot 18b is determined in such a manner that it can substantially cover the rectilinear motion of the movable member 18 according to the rotation of the operating lever 14.

On the other hand, while the movable member 18 which moves forwardly and backwardly in the length direction of the body 10 and the operating lever 14 which rotates in a horizontal direction relative to any one of the longitudinal sides of the body 10 operate in a crossed direction to each other, the movable member 18 and the operating lever 14 are disposed on the upper and lower positions relative to each other, at the time when the operating lever 14 is inserted into the interior of the receiving chamber 12 of the body 10. In the preferred embodiment of the present invention, the movable member 18 is disposed on the upper position of the operating lever 14. Under the above arrangement, a power transmission device 20 is installed between the movable member 18 and the operating lever 14, for converting the rotating force of the operating lever 14 into the rectilinear motion of the movable member 18. In more detail, a gear 22 is installed at a predetermined position adjacent to the release button 14a of the operating lever 14, and in correspondence with the gear 22, a gear 24 is installed on the movable member 18. At least one of the two gears 22 and 24 is freely rotatable and preferably, the pair of gears 22 and 24 is rotatably installed. One of the gears 22 and 24 serves as a rotary member and the other serves as a guide member. At the time when the operating lever 14 and the movable member 18 cross up and down as the operating lever 14 is inserted into the interior of the receiving chamber 12 through the opening 12a, the teeth of the gear 22 of the operating lever 14 are engaged with the teeth of the gear 24 of the movable member 18, with a consequence that the gears 22 and 24 are arranged to rotate at least one gear of them. Under the above arrangement, the rotating force of the operating lever 14 is converted into the rectilinear motion of the movable member 18 as the operating lever 14 is inserted into the interior of the receiving chamber 12. When the operating lever 14 is fully inserted in the receiving chamber 12, the power transmission is completed and at this time, the movable member 18 moves backwardly relative to the fixed holding part 15 of the body 10, that is, in a direction approaching to the fixed holding part 15 and then holds the cooking container in the engaged relationship with the cooking container in the co-operation with the fixed holding part 15 of the body 10 and the movable holding part 18a of the movable member 18.

At this time, when the tongs holds the cooking container, that is, when the operating lever 14 is fully inserted into the receiving chamber 12 of the body 10, the rotating center shaft of the gear 22 of the power transmission device 20 installed on the operating lever 14 side is positioned somewhat over the rotating center shaft (which means the rotating center shaft placed on the center line of the forward and backward movements of the movable member 18) of the gear 24 installed on the movable member 18. The positioning of the gear 22 of the operating lever 14 is to suppress the easy deviation of the operating lever 14 from the body 10 when the operating lever 14 is inserted in the receiving chamber 12. In this case, when the operating lever 14 is fully inserted in the receiving chamber 12, since the operating lever 14 and the movable member 18 are engaged with each other in a stable manner by means of the gears 22 and 24 of the power transmission device 20, it is desirable that the elastic modulus of the spring means 17 supporting the rear portion of the movable member 18 is not excessively high, which ensures that the release button 14a operates in an easy manner.

On each or any one of the fixed holding part 15 of the body 10 and the movable holding part 18a of the movable member 18, a non-slip member 18c made of a heat-resisting rubber material is provided to prevent the damage such as scratch on the peripheral wall of the cooking container upon the holding operation, to absorb impacts applied, and to improve the friction force against the high-cut peripheral wall of the cooking container.

Figure 3:
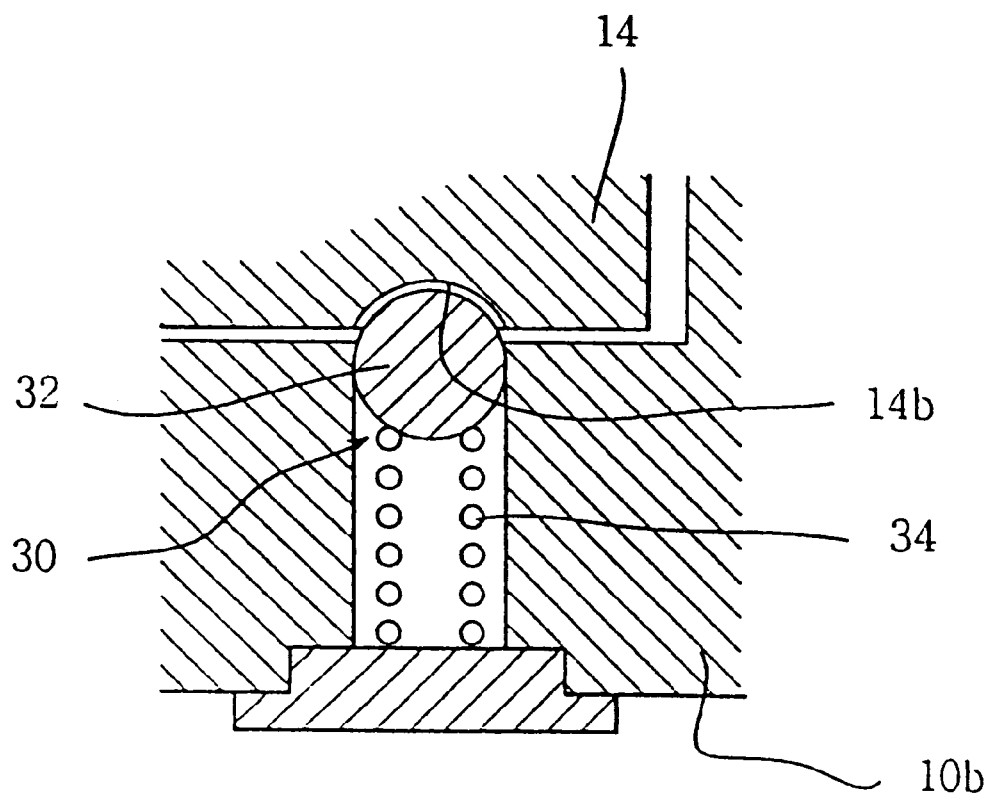
FIG. 3 is an enlarged sectional view taken along the line A—A of FIG. 1, which shows main parts of FIG. 1.

In more detail, FIG. 3 shows the locking structure of the operating lever 14, that is, a locking device 30 for suppressing the deviation of the operating lever 14 from the body 10 when the operating lever 14 is inserted into the body 10. The locking device 30 adopts a conventional ball type, as one example thereof. The locking device 30 includes a ball 32 whose part appears on the bottom surface of the receiving chamber 12 of the body 10 and an elastic member 34 for elastically supporting the ball 32. The ball 32 of the locking device 30 pushes and descends as the operating lever 14 is forcedly inserted into the receiving chamber 12 of the body 10 and springs and ascends into the interior of the locking groove 14b formed on the end of the operating lever 14 at the time when the operating lever 14 is fully inserted in the receiving chamber 12. At this time, the operating lever 14 is not easily deviated from the receiving chamber 12 by the elastic modulus of the elastic member 34. Of course, the elastic modulus of the elastic member 34 is determined within an appropriate range in consideration of the relation with the force necessary for the releasing operation of the release button 14a of the operating lever 14.

Figure 4A:
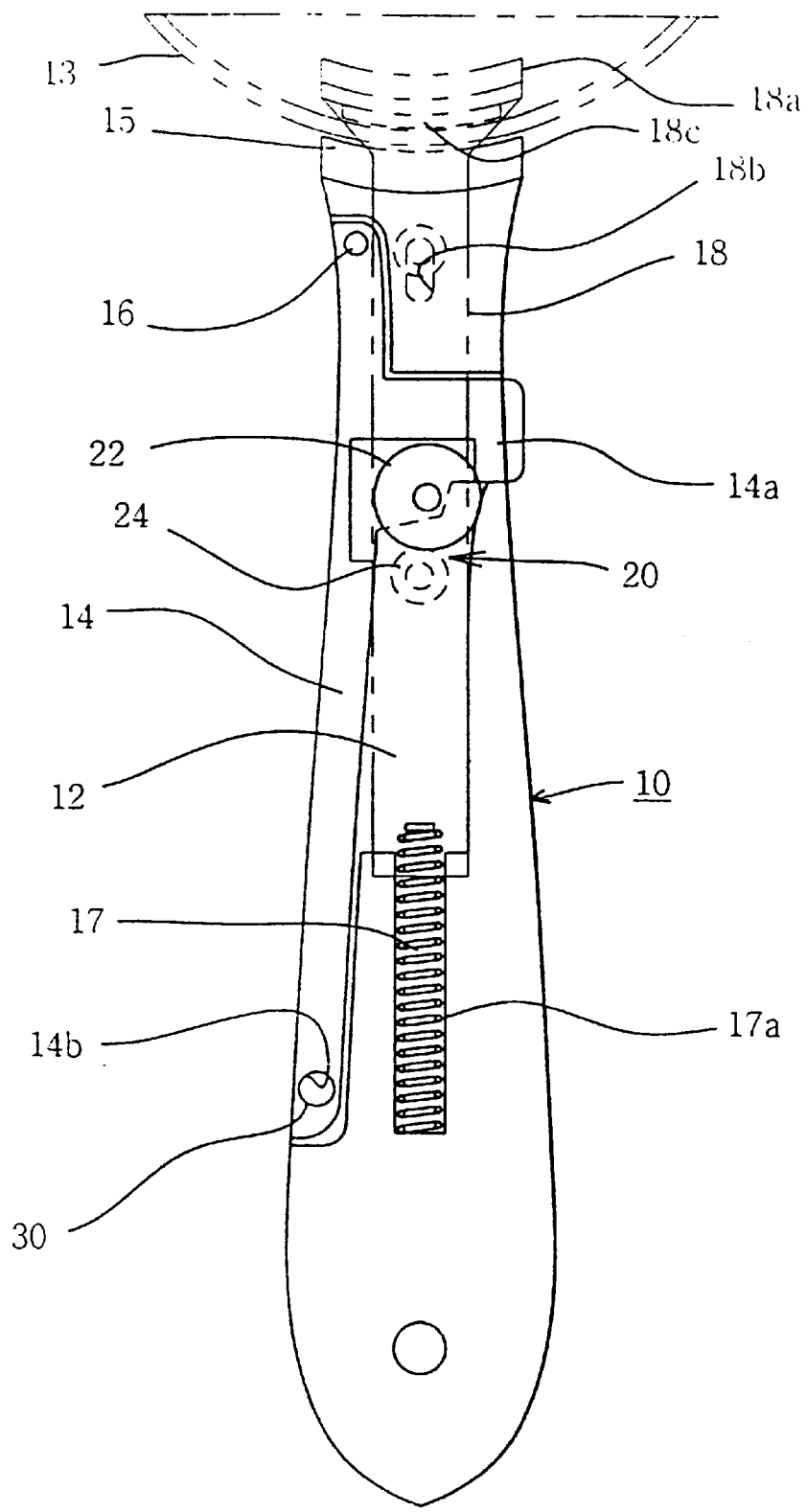
Figure 4B:
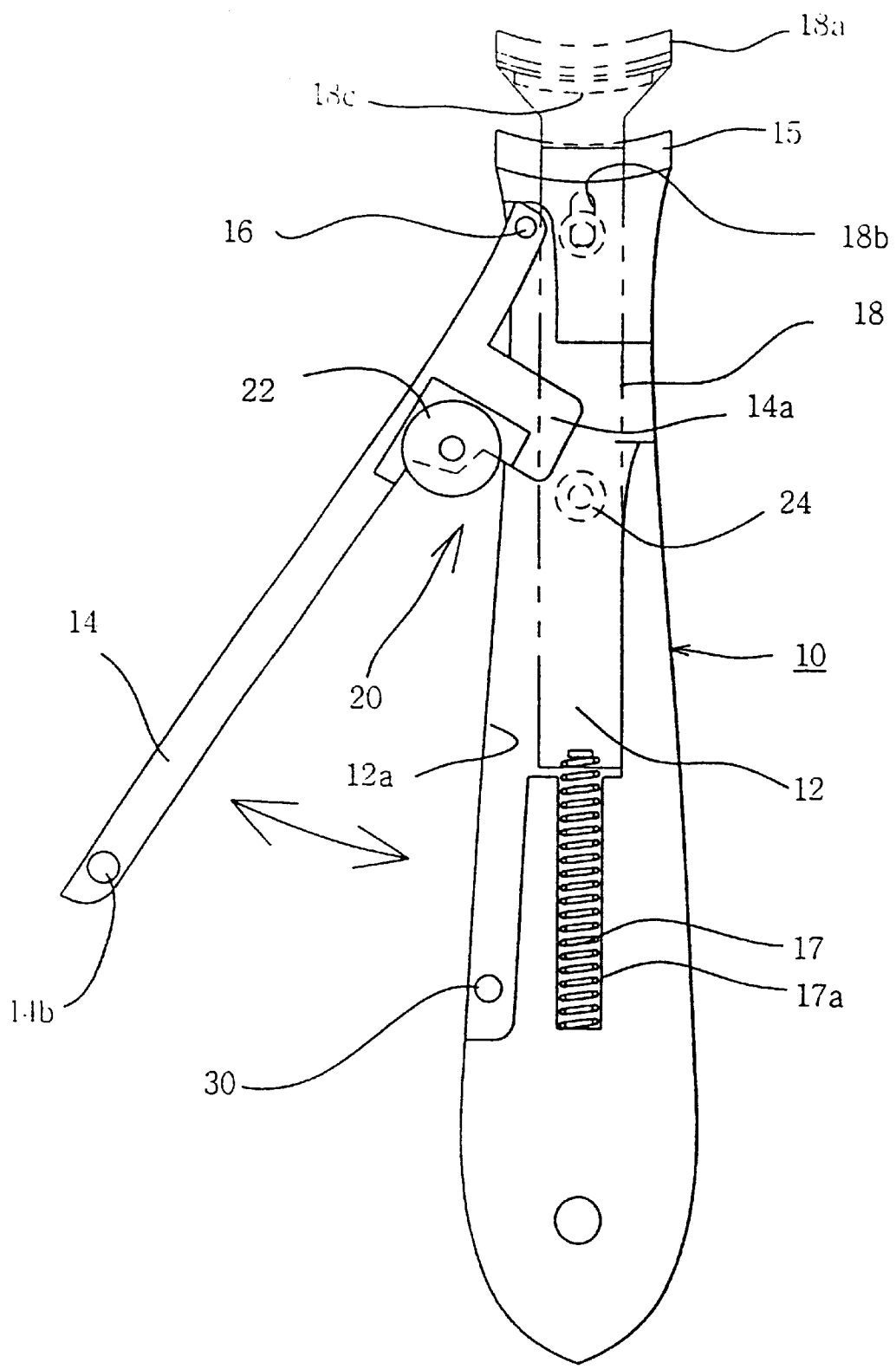

FIGS. 4a and 4b show the state before and after the tongs according to the present invention holds the cooking container. FIG. 4a shows, as the operating lever 14 is inserted into the body 10, the state where the tongs holds the cooking container. In more detail, the gear 22 installed on the operating lever 14 side and the gear 24 installed on the movable 18 are engaged to each other and rotate as the operating lever 14 is inserted into the receiving chamber 12 and thereby, the movable holding part 18a of the movable member 18 is drawn and pulls toward the fixed holding part 15 side of the body 10, thereby engaging the high cut portion 13 of the cooking container positioned between the movable holding part 18a and the fixed holding part 15 and holding the cooking container. At this time, the rotating center shaft of the gear 22 is disposed to be somewhat passed over the rotating center shaft of the gear 24 placed on the center line of the forward and backward movements of the movable member 18, such that the operating lever 14 is not easily deviated from the receiving chamber 12 of the body 10. Therefore, the tongs according to the present invention can maintain the holding state of the cooking container in a stable manner.

FIG. 4b shows the state before the tongs according to the present invention holds the cooking container or when releases the holding state of the cooking container. In more detail, if the release button 14a is pressed, the gears 22 and 24 of the power transmission device 20 rotate in a reverse direction to the rotating direction in the case where the operating lever 14 is inserted into the receiving chamber 12, as the operating lever 14 is drawn from the receiving chamber 12 of the body 10. As a result, the engaging state of the gears 22 and 24 is slowly released and if the engaging state is fully released, the movable member 18 moves forwardly relative to the body 10 by the extending force of the spring means 17. Therefore, the movable holding part 18a, which has been drawn to the fixed holding part 15 of the body 10, is distant from the fixed holding part 15, thereby releasing the holding state of the cooking container.

Figure 5:
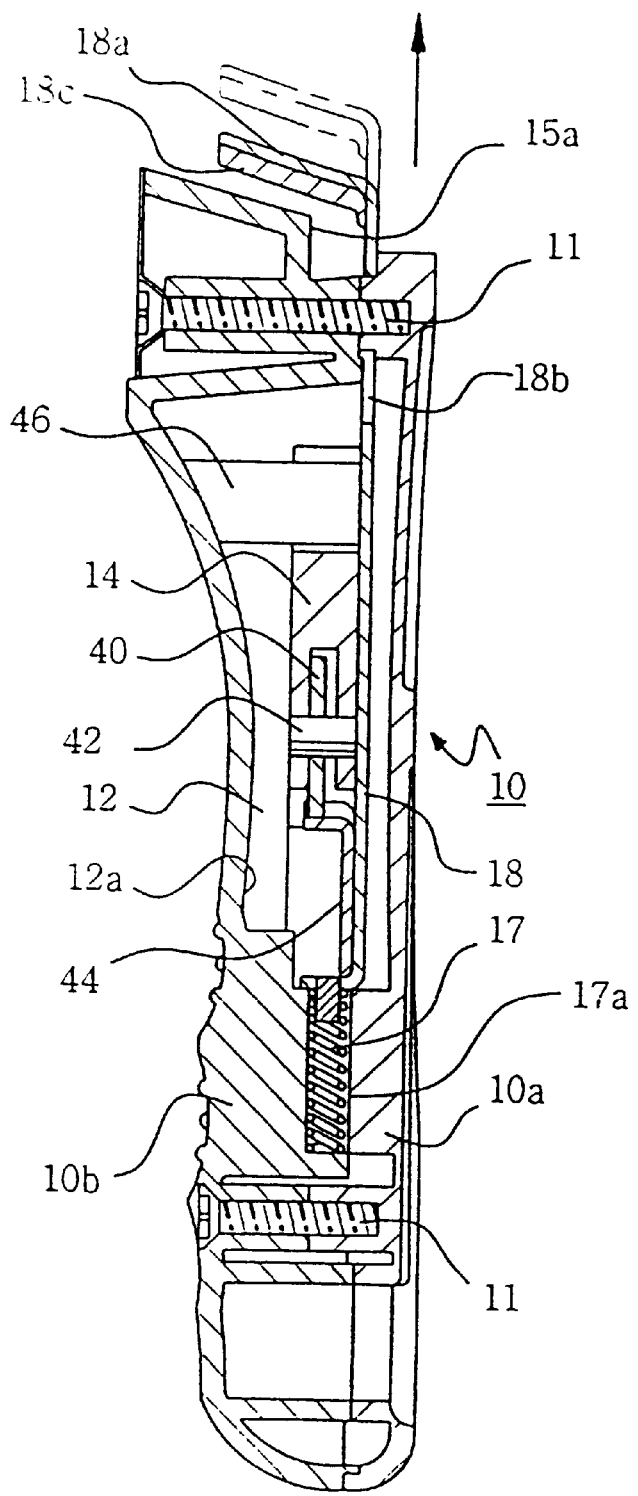
FIG. 5 is a sectional view illustrating tongs for holding a cooking container according to a second embodiment of the present invention.
Figure 6A:
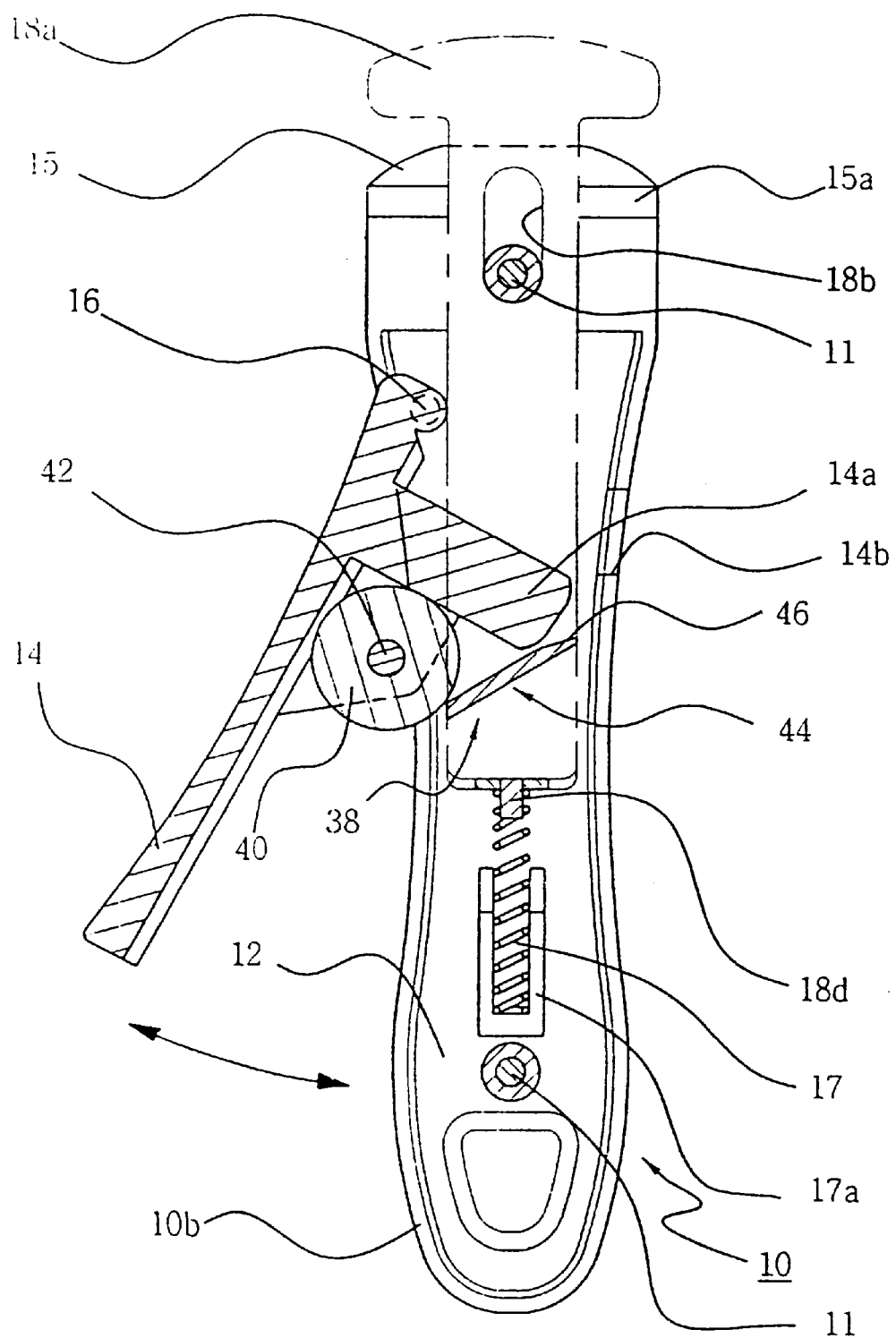
Figure 6B:
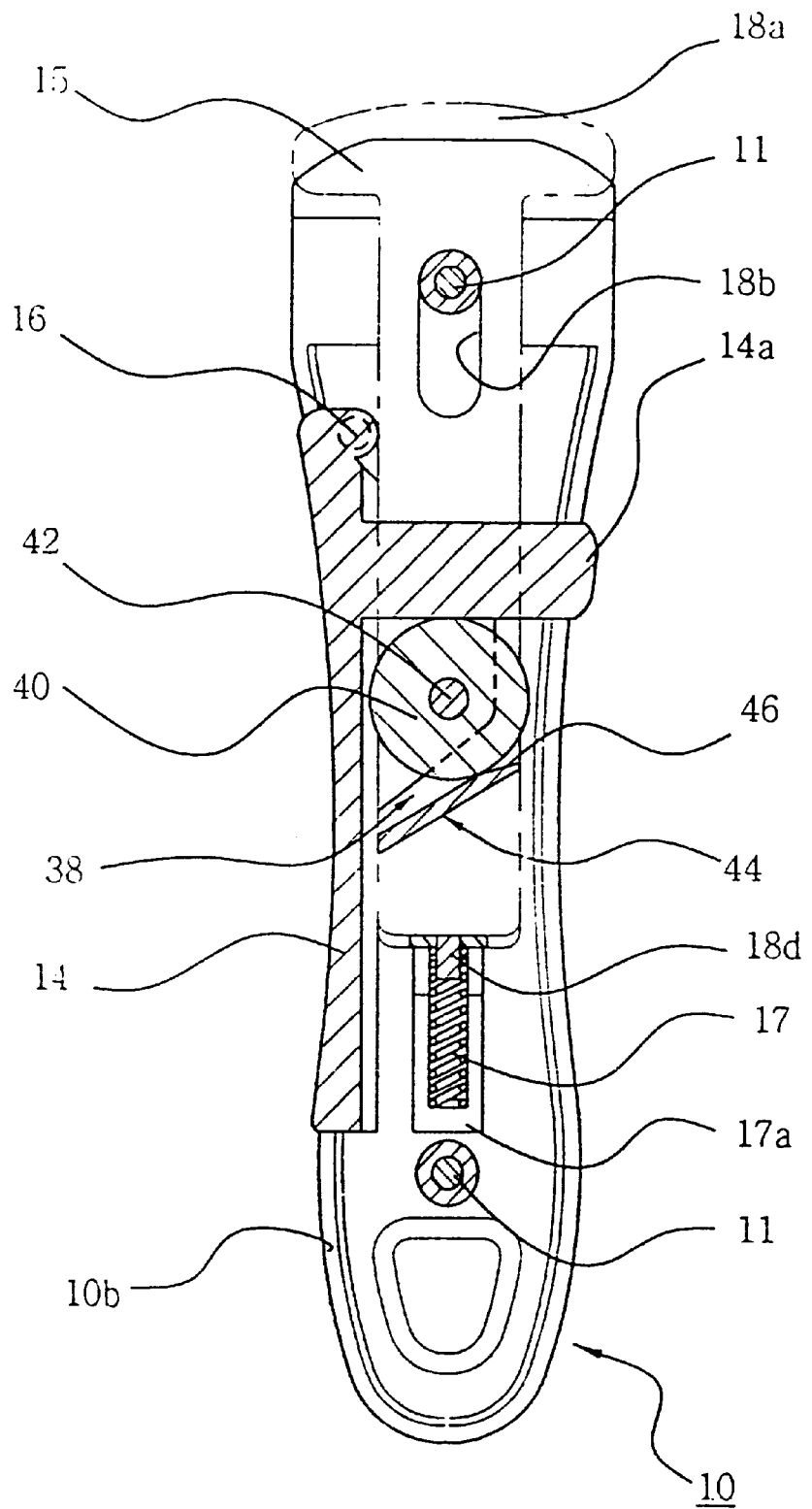

FIG. 5 is a sectional view illustrating tongs for holding a cooking container according to a second embodiment of the present invention, and FIGS. 6a and 6b show the operation of the tongs in FIG. 5. In the drawings, the same components as in the first embodiment of the present invention as shown in FIGS. 1 and 2 denote the same numbers, and an explanation of them will be avoided hereinafter for the sake of brevity.

Referring to FIGS. 5 to 6b, the tongs according to the second embodiment of the present invention includes the body 10 composed of the upper and lower members 10a and 10b. In the interior of the body 10 between the upper and lower members 10a and 10b, the receiving chamber 12 having an opening 12a is formed along one longitudinal side of the body 10. The upper and lower members 10a and 10b are coupled by means of the screw 11. The lower member 10b is provided with the fixed holding part 15 being in contact with the outer peripheral wall of the high cut portion 13 of the cooking container. The fixed holding part 15 forms the stage projection 15a on the upper side thereof.

The operating lever 14 is installed rotatably on the hinge shaft 16 installed on the front end side of the body 10 and is inserted and drawn into/from the receiving chamber 12 of the body 10. The operating lever 14 is provided with the release button 14a whose part is protruded to the exterior of the body 10 through an opening 14b formed on the lower member 10b at the time when the operating lever 14 is fully inserted into the receiving chamber 12. Therefore, as the release button 14a is pressed, the operating lever 14 is drawn from the receiving chamber 12.

Between the upper and lower members 10a and 10b of the body 10 is provided the movable member 18 disposed slidingly forwardly and backwardly. The movable member 18 has the movable holding part 18a for being directly engaged with the high cut portion 13 of the cooking container in co-operation with the fixed holding part 15 of the body 10. The one end of the movable member 18 is supported at a protrusion 18d thereof by means of the spring means 17 received in the recess 17a formed in the body 10 and thereby, as the operating lever 14 is drawn from the receiving chamber 12, the movable member 18 moves forwardly relative to the body 10 by the restoring force of the spring means 17. Also, the movable member 18 is provided with a slot 18b in which a supporting body such as the screw 11 is disposed in the perpendicular direction thereto. Thus, the forward and backward moving distance of the movable member 18 is restricted to the stroke distance of the slot 18b by means of the supporting body and the slot 18b. A support plate 46 extends upwardly from the bottom surface of the lower member 10b and serves to stably support the movable member 18, with a result that the movable member 18 can move smoothly between the upper and lower members 10a and 10b. The movable holding part 18a of the movable member 18 is provided with the non-slip member 18c made of a heat-resisting rubber material.

While the movable member 18 moves forwardly and backwardly along the length direction of the body 10, the operating lever 14 rotates in the crossed direction to the length direction of the body 10, such that the movable member 18 and the operating lever 14 move in the cross direction to each other. In other words, when the operating lever 14 is inserted into the receiving chamber 12 through the opening 12a, the operating lever 14 is positioned on the lower portion of the movable member 18. Under the above arrangement, the power transmission device 38 is disposed between the movable member 18 and the operating lever 14, for the purpose of converting the rotating force of the operating lever 14 into the rectilinear motion of the movable member 18. In more detail, the operating lever 14 is provided with a rotary disc 40 as a rotating member rotatably installed on the lower portion of the release button 14a by using a shaft pin 42. In correspondence to the rotary disc 40, the movable member 18 is provided with a rail 44 as a guide member having an inclined surface and for guiding the rotary disc 40, as the operating lever 14 is slowly inserted into the receiving chamber 12. The inclined surface of the rail 44 is inclined upwardly toward the interior of the receiving chamber 12, that is, the opposite side of the opening 12a from the opening 12a of the receiving chamber 12. The inclined surface has a reverse inclination surface 46 that has a reverse inclination relative to the inclination of the inclined surface. Thus, when the operating lever 14 is fully inserted into the receiving chamber 12, the part of the rotary disc 40 is placed on the reverse inclination surface 46, with a consequence that the sliding of the rotary disc 40 to the opening 12a of the receiving chamber 12 from the rail 44 can be prevented. The inclination of the reverse inclination surface 46 is less than or equal to that of the inclined surface.

Under the above construction of the power transmission device 38, when the operating lever 14 and the movable member 18 cross up and down as the operating lever 14 is inserted into the receiving chamber 12, the circumferential surface of the rotary disc 40 of the operating lever 14 is in contact with the inclined surface of the rail 44. As the operating lever 14 is continuously inserted into the receiving chamber 12, the rotating force of the operating lever 14 is converted into the rectilinear motion of the movable member 18 through the rotary disc 40 and the rail 44. Then, if the operating lever 14 is fully inserted into the receiving chamber 12, the part of the circumferential surface of the rotary disc 40 is placed on the reverse inclination surface 46 of the rail 44 and thus, the rotary disc 40 rotates in a reverse direction from the rail 44, such that the drawing of the operating lever 14 from the receiving chamber 12 can be prevented.

At this time, the movable member 18 moves backwardly relative to the body 10 as the operating lever 14 is inserted into the receiving chamber 12 and thereby, the fixed holding part 15 of the body 10 and the movable holding part 18a of the movable member 18 hold the high cut portion of the cooking container in the co-operation with each other. When the holding state of the cooking container is released, if the release button 14 is pressed, the rotary disc 40 is guided from the rail 44 and the operating lever 14 itself is drawn from the receiving chamber 12. Also, the movable member 18 moves forwardly relative to the body 10 by means of the spring means 17, thereby releasing the holding state of the cooking container.

As mentioned above, tongs for holding a cooking container according to the present invention is capable of holding and releasing the cooking container by rotating an operating lever in a horizontal direction in parallel to a body on the longitudinal side of the body, thereby moving the cooking container in a stable manner.

In addition, upon holding the cooking container, the tongs according to the present invention is capable of locking an edge provided outwardly on the peripheral surface of the high-cut upper portion of the cooking container to a locking projection provided on a fixed holding part of a body, thereby holding the cooking container in a more stable manner.

Moreover, the tongs according to the present invention includes a power transmission device for converting a rotating force of the operating lever into a rectilinear motion of a movable member by using a rotary disc and a rail or a pair of gears, thereby enduring a high load.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Tongs for holding a cooking container, comprising:

a body being of a shape adequate to be held by a hand and extending by a predetermined length in a longitudinal direction thereof, said body having a fixed holding part being in contact with the high-cut outer peripheral wall of the cooking container at the end portion thereof and a receiving chamber formed in the interior thereof;

a movable member having a movable holding part being in contact with the high-cut inner peripheral wall of the cooking container at the end portion thereof in order to hold the cooking container in relation to said fixed holding part of said body, said movable member received within said receiving chamber and having one end connected to spring means installed in said body, thus to be disposed within said body forwardly and backwardly relative to said fixed holding part;

an operating lever supported rotatably on said body at the one end thereof, thus to be inserted and drawn into/from the interior and exterior of said receiving chamber; and a power transmission device having a first rotary member and a second rotary member, said first rotary member and said second rotary member converting a rotating force of said operating lever into a rectilinear motion of said movable member, in co-operation with each other, as said operating lever is inserted into said receiving chamber, for moving said movable member into the interior of said receiving chamber to be engaged with the high cut portion of the cooking container, thereby holding the cooking container in co-operation with said fixed holding part and said movable member; whereby as said operating lever is drawn from said receiving chamber, the co-operating relationship of said first rotary member and said second rotary member is released and by the recovering force of said spring means, said movable member moves forwardly relative to said fixed holding part, thus to release the holding state of the cooking container.

2. The tongs for holding the cooking container of claim 1, wherein said movable member further comprises a stroke adjusting part for adjusting forward and backward moving distances of said movable member.

3. The tongs for holding the cooking container of claim 2, wherein said stroke adjusting part adjusts the forward and backward moving distances of said movable member by means of a slot formed on said movable member in forward and backward directions of said movable member and a supporting body disposed in said slot and supported on a predetermined portion of said body.

4. The tongs for holding the cooking container of claim 1, wherein said body comprises upper and lower members and said movable member is supported slidingly between said upper and lower members, such that as said power transmission device is inserted into said receiving chamber, said movable member moves backwardly relative to said fixed holding part and as said power transmission device is drawn from said receiving chamber, moves forwardly relative to said fixed holding part.

5. The tongs for holding the cooking container of claim 4, wherein said operating lever is inserted and drawn into/from said receiving chamber in a horizontal direction relative to said body.

6. The tongs for holding the cooking container comprising:
a body being of a shape adequate to be held by a hand and extending by a predetermined length in a longitudinal direction thereof, said body having a fixed holding part being in contact with the high-cut outer peripheral wall of the cooking container at the end portion thereof and a receiving chamber formed in the interior thereof;
a movable member having a movable holding part being in contact with the high-cut inner peripheral wall of the cooking container at the end portion thereof in order to hold the cooking container in relation to said fixed holding part of said body, said movable member received within said receiving chamber and having one end connected to spring means installed in said body, thus to be disposed within said body forwardly and backwardly relative to said fixed holding part;
an operating lever supported rotatably on said body at the one end thereof, thus to be inserted and drawn into/from the interior and exterior of said receiving chamber; and
a power transmission device having a rotary member and a guide member, said rotary member and said guide member converting a rotating force of said operating lever into a rectilinear motion of said movable member, in co-operation with each other, as said operating lever is inserted into said receiving chamber, for moving said movable member into the interior of said receiving chamber to be engaged with the high cut portion of the cooking container, thereby holding the cooking container in co-operation with said fixed holding part and said movable member; whereby as said operating lever is drawn from said receiving chamber, the co-operating relationship of said rotary member and said guide member is released and by the recovering force of said spring means, said movable member moves forwardly relative to said fixed holding part, thus to release the holding state of the cooking container,
wherein said rotating member of said power transmission device is a rotary disc and said guide member is a rail having an inclined surface and for guiding said rotary disc as said operating lever is slowly inserted into said receiving chamber, such that as said operating lever is inserted into said receiving chamber, said rotary disc rotates and gradually moves to the interior of said receiving chamber on said rail and converts the rotating force of said operating lever into the rectilinear motion of said movable member in co-operation with said rail, thereby holding the cooking container in the cooperation with said movable member and said fixed holding part.

7. The tongs for holding the cooking container of claim 6, wherein said rotary disc is assembled rotatably to said operating lever, said rail is assembled to said movable member, and said inclined surface of said rail is inclined upwardly toward the interior of said receiving chamber to the opening thereof and guides said rotary disc as said operating lever is inserted into said receiving chamber.

8. The tongs for holding the cooking container of claim 7, wherein said inclined surface of said rail has a reverse inclination surface that has a reverse inclination relative to the inclination of said inclined surface, on the opposite position to the opening of said receiving chamber of said body, such that when said operating lever is fully inserted into said receiving chamber, the part of said rotary disc is placed on said reverse inclination surface, with a consequence that the sliding of said rotary disc to the opening of said receiving chamber from said rail can be prevented.

9. The tongs for holding the cooking container, comprising:
a body being of a shape adequate to be held by a hand and extending by a predetermined length in a longitudinal direction thereof, said body having a fixed holding part being in contact with the high-cut outer peripheral wall of the cooking container at the end portion thereof and a receiving chamber formed in the interior thereof;
a movable member having a movable holding part being in contact with the high-cut inner peripheral wall of the cooking container at the end portion thereof in order to hold the cooking container in relation to said fixed holding part of said body, said movable member received within said receiving chamber and having one end connected to spring means installed in said body, thus to be disposed within said body forwardly and backwardly relative to said fixed holding part;
an operating lever supported rotatably on said body at the one end thereof, thus to be inserted and drawn into/from the interior and exterior of said receiving chamber; and
a power transmission device having a rotary member and a guide member, said rotary member and said guide member converting a rotating force of said operating lever into a rectilinear motion of said movable member, in co-operation with each other, as said operating lever is inserted into said receiving chamber, for moving said movable member into the interior of said receiving chamber to be engaged with the high cut portion of the cooking container, thereby holding the cooking container in co-operation with said fixed holding part and said movable member; whereby as said operating lever is drawn from said receiving chamber, the co-operating relationship of said rotary member and said guide member is released and by the recovering force of said spring means, said movable member moves forwardly relative to said fixed holding part, thus to release the holding state of the cooking container,
wherein said rotating member and said guide member of said power transmission device each comprises a gear, at least one of the pair of gears installed rotatably, such that as said operating lever is inserted into said receiving chamber, the pair of gears are in rolling contact with each other to convert the rotating force of said operating lever into the rectilinear motion of said movable member, thereby holding the high cut portion of the cooking container in co-operation with said movable member and said fixed holding part.

10. The tongs for holding the cooking container of claim 1, wherein said operating lever further comprises a release knob extending from said operating lever to be protruded to the exterior of said body, when said operating lever is fully inserted into said receiving chamber, and if said release knob is pressed, said operating lever is released from said receiving chamber.

11. The tongs for holding the cooking container, comprising:

a body being of a shape adequate to be held by a hand and extending by a predetermined length in a longitudinal direction thereof, said body having a fixed holding part being in contact with the high-cut outer peripheral wall of the cooking container at the end portion thereof and a receiving chamber formed in the interior thereof;

a movable member having a movable holding part being in contact with the high-cut inner peripheral wall of the cooking container at the end portion thereof in order to hold the cooking container in relation to said fixed holding part of said body, said movable member received within said receiving chamber and having one end connected to spring means installed in said body, thus to be disposed within said body forwardly and backwardly relative to said fixed holding part;

an operating lever supported rotatably on said body at the one end thereof, thus to be inserted and drawn into/from the interior and exterior of said receiving chamber; and a power transmission device having a rotary member and a guide member, said rotary member and said guide member converting a rotating force of said operating lever into a rectilinear motion of said movable member, in co-operation with each other, as said operating lever is inserted into said receiving chamber, for moving said movable member into the interior of said receiving chamber to be engaged with the high cut portion of the cooking container, thereby holding the cooking container in co-operation with said fixed holding part and said movable member; whereby as said operating lever is drawn from said receiving chamber, the co-operating relationship of said rotary member and said guide member is released and by the recovering force of said spring means, said movable member moves forwardly relative to said fixed holding part, thus to release the holding state of the cooking container, wherein said body further comprises a groove, a spring mounted on said groove, and a ball supported by said spring to be movable up and down, and said operating lever further comprises a locking groove into which said ball is received when said operating lever is inserted into said receiving chamber, such that the holding state of said movable member and said fixed holding part is not easily released.

12. The tongs for holding the cooking container, comprising:

a body being of a shape adequate to be held by a hand and extending by a predetermined length in a longitudinal direction thereof, said body having a fixed holding part being in contact with the high-cut outer peripheral wall of the cooking container at the end portion thereof and a receiving chamber formed in the interior thereof;

a movable member having a movable holding part being in contact with the high-cut inner peripheral wall of the cooking container at the end portion thereof in order to hold the cooking container in relation to said fixed holding part of said body, said movable member received within said receiving chamber and having one end connected to spring means installed in said body, thus to be disposed within said body forwardly and backwardly relative to said fixed holding part; an operating lever supported rotatably on said body at the one end thereof, thus to be inserted and drawn into/from the interior and exterior of said receiving chamber; and a power transmission device having a rotary member and a guide member, said rotary member and said guide member converting a rotating force of said operating lever into a rectilinear motion of said movable member, in co-operation with each other, as said operating lever is inserted into said receiving chamber, for moving said movable member into the interior of said receiving chamber to be engaged with the high cut portion of the cooking container, thereby holding the cooking container in co-operation with said fixed holding part and said movable member; whereby as said operating lever is drawn from said receiving chamber, the co-operating relationship of said rotary member and said guide member is released and by the recovering force of said spring means, said movable member moves forwardly relative to said fixed holding part, thus to release the holding state of the cooking container, wherein said movable member further comprises a non-slip member made of a heat-resisting elastic material having a buffering function by an elastic force thereof, for preventing the sliding of the cooking container upon holding the cooking container.

* * * * *